United States Patent [19]
Nishioka et al.

[11] Patent Number: 5,221,061
[45] Date of Patent: Jun. 22, 1993

[54] TAPE-GUIDE MADE FROM SYNTHETIC RESIN

[75] Inventors: Makoto Nishioka; Tsuneo Ishii, both of Yokohama, Japan

[73] Assignee: Sanshin Industry Co., Ltd., Yokohama, Japan

[21] Appl. No.: 591,734

[22] Filed: Oct. 2, 1990

[30] Foreign Application Priority Data

Oct. 5, 1989 [JP] Japan .................................. 1-260868

[51] Int. Cl.$^5$ ...................... B65H 23/04; B65H 27/00
[52] U.S. Cl. .................... 242/199; 226/196; 525/240
[58] Field of Search ................. 242/197, 198, 199, 76; 360/132; 525/240; 226/196

[56] References Cited

U.S. PATENT DOCUMENTS

| | | | |
|---|---|---|---|
| 4,276,575 | 6/1981 | Schoettle et al. | 226/196 X |
| 4,417,704 | 11/1983 | Oishi et al. | 226/196 X |
| 4,429,823 | 2/1984 | Umehara | 226/196 |
| 4,745,508 | 5/1988 | Tollefson | 360/132 X |
| 4,746,575 | 5/1988 | Scarati et al. | 360/132 X |
| 4,748,529 | 5/1988 | Shiba et al. | 360/132 X |
| 4,786,687 | 11/1988 | Sano et al. | 525/240 |
| 4,821,135 | 4/1989 | Nakanishi et al. | 360/132 |
| 4,853,427 | 8/1989 | Herten et al. | 525/221 X |
| 4,933,393 | 6/1990 | Toyota et al. | 525/319 X |
| 4,935,833 | 6/1990 | Shiba et al. | 292/199 X |
| 5,074,451 | 12/1991 | Tollefson et al. | 226/196 |

*Primary Examiner*—Daniel P. Stodola
*Assistant Examiner*—John Rollins
*Attorney, Agent, or Firm*—Brown, Martin Haller & McClain

[57] ABSTRACT

A semi-cylindrical tape-guide for a magnetic tape is formed by an injection molding process of a mixture material containing 60 to 89% by weight of an ultra-high-molecular-weight polyorefin base resin, having a molecular weight of 800,000, and 4 to 25% by weight of an inorganic additive.

5 Claims, 5 Drawing Sheets

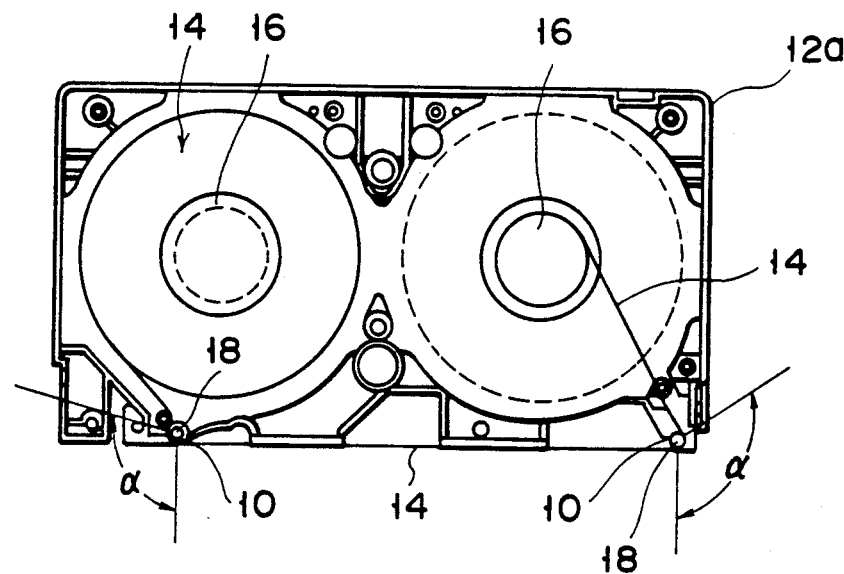
FIG. 2
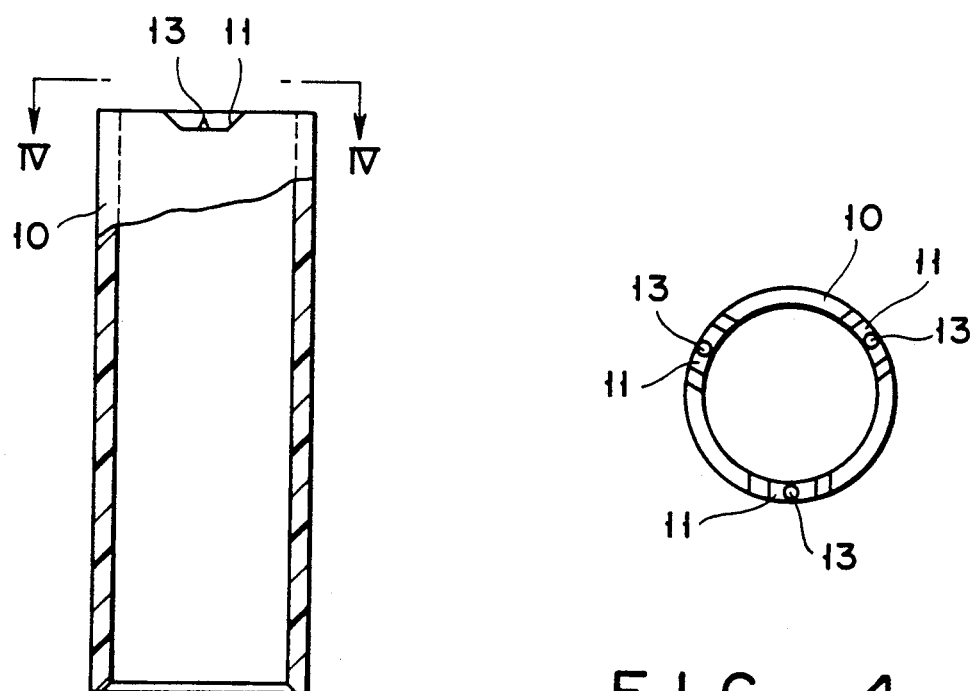
FIG. 3
FIG. 4

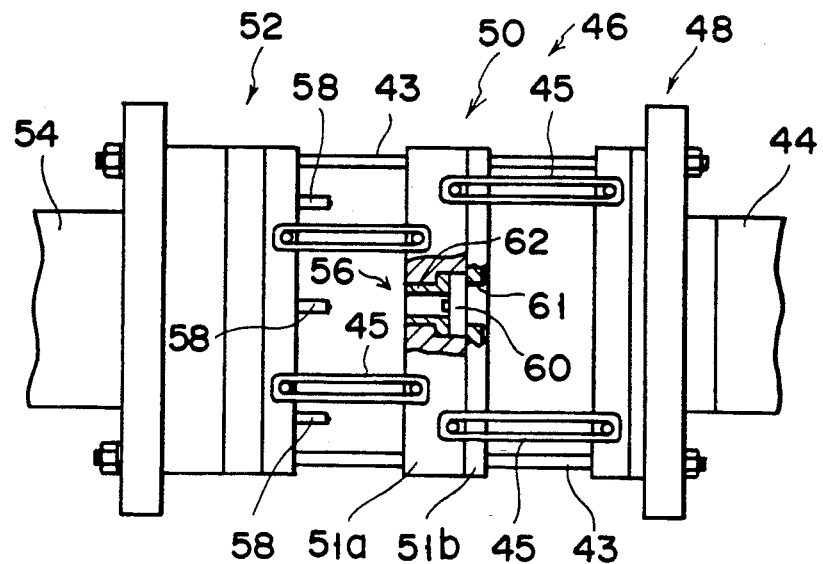
F I G. 8
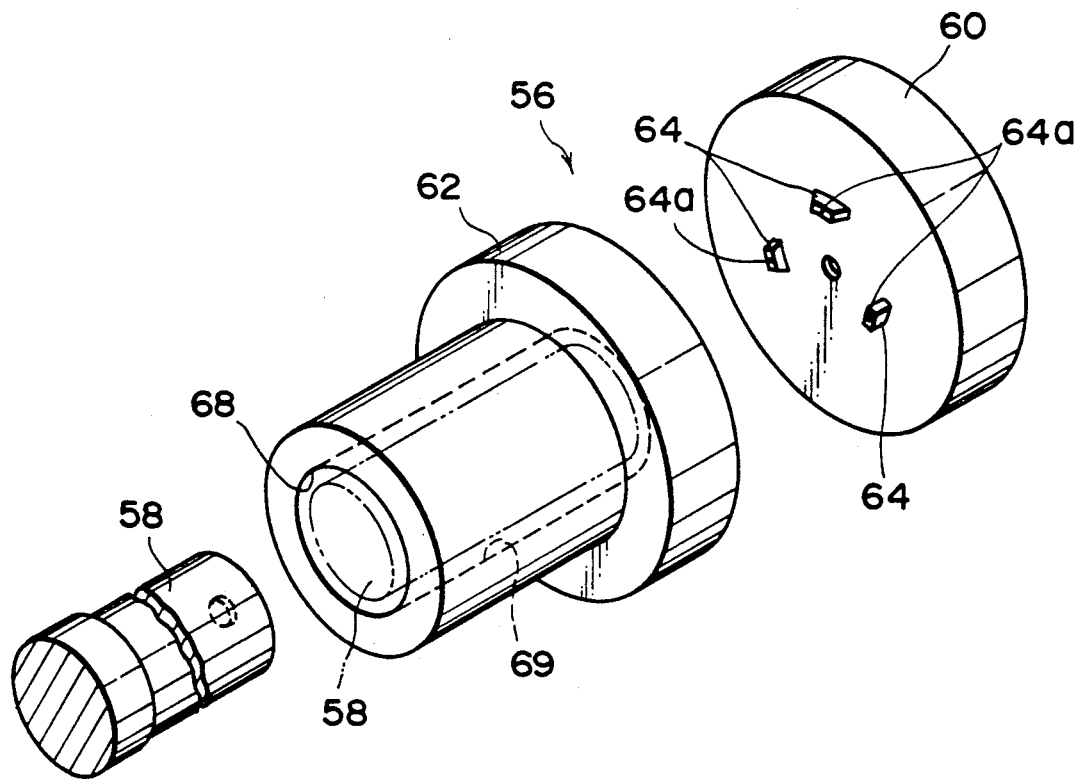
F I G. 9

TAPE-GUIDE MADE FROM SYNTHETIC RESIN

BACKGROUND OF THE INVENTION

1. Field of the Invention

The present invention relates to a tape-guide made from synthetic resin situated within, e.g. a magnetic tape cassette for a video recorder, a method of manufacturing the tape-guide, and an apparatus for manufacturing the tape-guide.

2. Description of the Related Art

In general, in a video recorder, a magnetic tape is employed as a recording medium for recording image signals. The magnetic tape is wound around a reel, and contained within a cassette. This type of magnetic tape is generally thin and made of a plastic material. The tape has a recording surface coated with magnetizable ferrite particles. A pair of tape-guides are disposed within the magnetic tape cassette. The tape-guides serve to guide the magnetic tape so that the recording surface of the magnetic tape may slide over a recording/reproducing magnetic head of the video recorder. In general, the tape-guide is put in direct contact with the rear surface (opposite to the recording surface) of the magnetic tape. The tape-guide must meet the following conditions:

1) The tape-guide is made of non-magnetic material for obtaining clear images,

2) The tape-guide has a smooth surface in order to allow the tape to run smoothly and to prevent deterioration (extension) of the tape, and 3) The surface of the tape-guide has a hardness of a predetermined value or more, in order to prevent damage to the tape.

Conventionally, these three conditions have been met by tape-guides made of processed metallic material. The metallic material is mainly brass or non-magnetic stainless steel which allows cutting and polishing with the surface precision of 0.2 to 0.8 $\mu$m. When the tape-guide is made of brass, the Vickers hardness (VH) can be set to 800 to 900 by means of surface processing such as hard chrome plating. On the other hand, when the tape-guide is made of stainless steel, VH can be set to 350 to 400. Tape-guides made of such metallic materials can meet the above three conditions.

When the tape-guide is made of the aforementioned metallic material, however, five steps, i.e. material formation, polishing, plating, finish-polishing, and inspection/packaging, are necessary. Thus, a great deal of time is required to manufacture a finished product from a raw material, and special skill is required in a polishing step. Consequently, the manufacturing cost is increased.

SUMMARY OF THE INVENTION

The present invention has been devised in consideration of the above circumstances, and its object is to provide a tape-guide made from synthetic resin manufactured very easily and inexpensively, a method of manufacturing the tape-guide, and an apparatus for manufacturing the tape-guide.

According to the present invention, there is provided a tape-guide for a magnetic tape, said guide being formed by an injection molding process of a mixture material containing 60 to 89% by weight of an ultra-high-molecular-weight polyolefin base resin, having a molecular weight of 800,000, and 4 to 25% by weight of an inorganic additive.

This tape-guide is manufactured by a method of manufacturing a tape-guide for a magnetic tape, said tape-guide including at least a substantially cylindrical portion and made of a mixture material containing at least 60 to 89% by weight of an ultra-high-molecular-weight polyolefin base resin, 4 to 25% by weight of an inorganic additive, and 0.17 to 0.31% by weight of a lubricant, said polyolefin base resin having a molecular weight of 800,000 and including 7 to 13% by weight of ultra-high-molecular-weight polyethylene resin having a molecular weight of 150 million to 350 million, said method comprising the steps of:

measuring predetermined amounts of said ultra-high-molecular-weight polyolefin base resin, said inorganic additive, and said lubricant;

mixing said measured materials homogeneously;

pelletizing the mixed material;

melting the pelletized mixed material; and injection-molding the molten material in a mold cavity.

In addition, this tape-guide is manufactured by an apparatus for manufacturing a tape-guide for a magnetic tape, said tape-guide being made of a mixture material containing at least 60 to 89% by weight of an ultra-high-molecular-weight polyolefin base resin, 4 to 25% by weight of an inorganic additive, and 0.17 to 0.31% by weight of a lubricant, said polyolefin base resin having a molecular weight of 800,000 and including 7 to 13% by weight of ultra-high-molecular-weight polyethylene resin having a molecular weight of 150 million to 350 million, said apparatus comprising:

a mixing station for measuring predetermined amounts of said ultra-high-molecular-weight polyolefin base resin, said inorganic additive, and said lubricant, and mixing said measured materials homogeneously;

a pelletizing station for pelletizing the mixed material;

a drying station for drying said pelletized mixed material; and an injection-molding station for injection-molding the dried mixed material.

According to the present invention, there can be obtained a tape-guide having the same properties as a metallic tape-guide. This tape-guide can be manufactured by inexpensive equipment, and the cost of the material is reduced, compared to the case where metallic material is used. In addition, the cost for the manufacturing process is low.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 shows the relationship between the magnetic tape and the tape-guide within the cassette shown in FIG. 1;

FIG. 3 is a partial cross-sectional view of the cylindrical tape-guide according to the embodiment of the invention;

FIG. 4 is a plan view taken along line IV—IV in FIG. 3;

FIG. 8 schematically shows a device for forming the tape-guide; and

FIG. 9 is an exploded perspective view schematically showing a mold used in the forming device of FIG. 8.

DETAILED DESCRIPTION OF THE PREFERRED EMBODIMENTS

Embodiments of the present invention will now be described with reference to the accompanying drawings.

Figure 1:
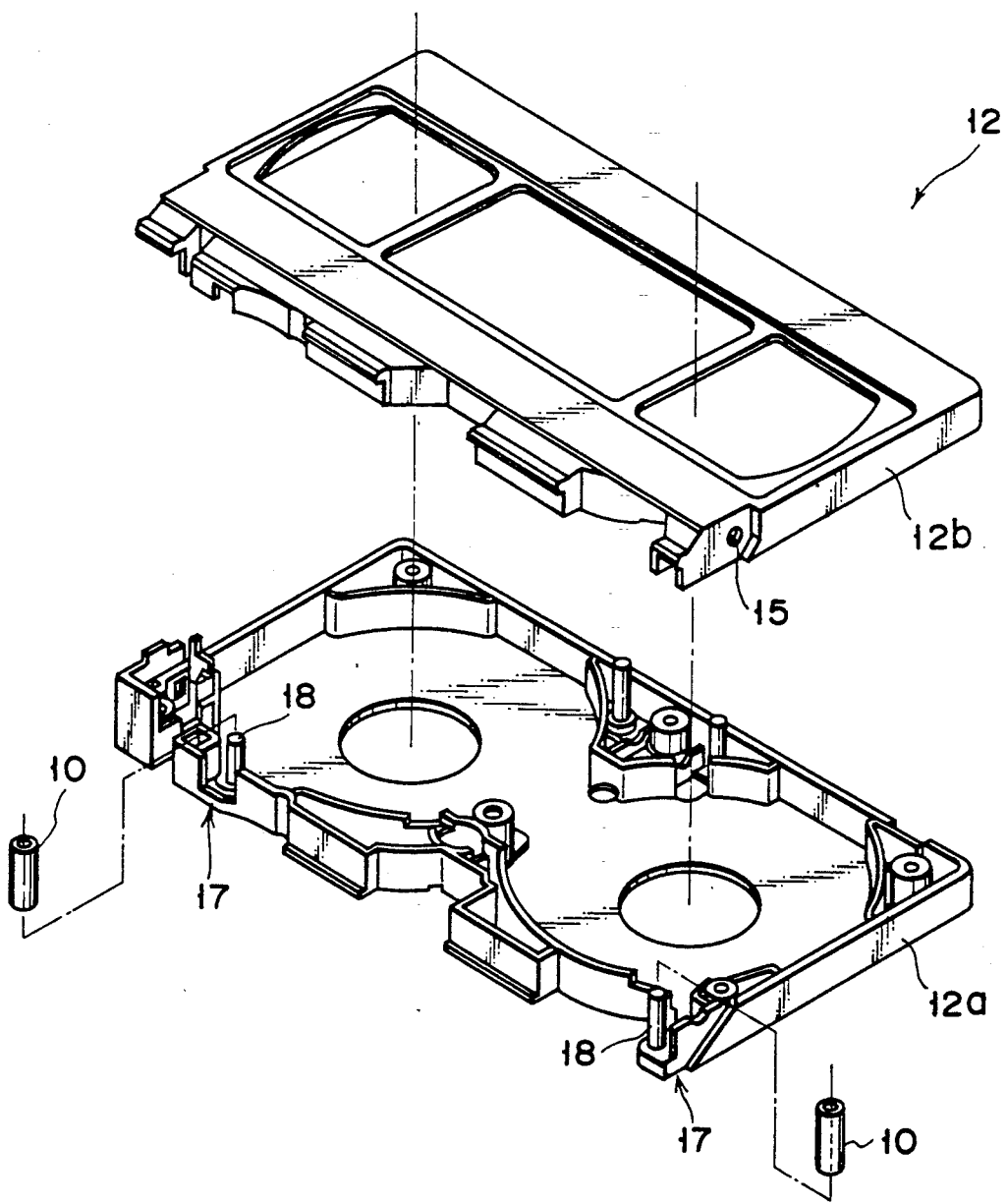
FIG. 1 is an exploded perspective view showing tape-guides according to an embodiment of the invention, along with a magnetic tape cassette in which the tape-guides are arranged.

As is shown in FIGS. 1 and 2, tape-guides 10 according to an embodiment of the present invention are disposed within a cassette body 12 comprising a lower cover 12a and upper cover 12b. The cassette body 12 is of the conventional type, which constitutes a magnetic tape cassette for use in a video recorder. The cassette body 12 contains two reels 16 on which magnetic tape 14 is wound. A pair of openings 17 are formed at one side of the lower cover 12a. A pair of pins 18 are disposed adjacent to the openings 17. The tape-guides 10 are fitted on the pins 18. The magnetic tape 14 is guided to the outside of the cassette body 12 through one of the openings 17, and the tape 14 is guided into the cassette body 12 through the other opening 17. Reference numeral 15 denotes a hole with which a flap (not shown) situated outside the cassette body 12 for protecting the magnetic tape 14 is engaged. In FIG. 2, symbol "a" denotes a range over which the magnetic tape 14 contacts the tape-guide 10.

Conventionally, the tape-guide 10 is formed of a metallic material such as stainless steel. The applicant conducted experiments with respect to various materials which are less expensive than the conventional metallic material, and have the characteristics equivalent to those of the metallic material.

Specifically, polyacetal, liquid crystal polymer, polyphenylene sulfide, ultra-high-molecular-weight polyethylene, etc. were employed in the experiments.

Table 1 (below) shows the results of comparison between tape-guides made of resinous materials and a conventional tape-guide made of non-magnetic stainless steel.

TABLE 1

| Material | Results of Running Tests Test Item | | | | |
|---|---|---|---|---|---|
| | Rewind Torque (g/cm) | Tape Scar | Tape-Guide Scar | Exfoliated Powder | Surface Hardness (R Scale) |
| Polyacetal | 350 | x | x | White Powder | 120 |
| Liquid Crystal Polymer | 400 | x | x | White Powder | 110 |
| Polyphenylene Sulfide | 400 | x | x | White Powder | 120 |
| Ultra-High-Molecular-Weight Polyethylene | 250 | Δ | Δ | Not Found | 65 |
| Ultra-High-Molecular-Weight Polyethylene + Aluminum Silicate 17% | 250 | o | o | Not Found | 90 |
| Stainless Steel | 250 | o | o | Not Found | — |

Method of Running Tests

Tape-guides for tests were disposed in standard 120-minute magnetic tape cassettes for used in video recorders. These cassettes were mounted in the recorders, and the magnetic tapes were reproduced and rewound 50 times, respectively. Data relating to a minimum rewind torque was obtained and confirmed. After the tests, it was observed, by the naked eye, whether scars, exfoliated powder and damage appear on the tape-guides and magnetic tapes. In Table 1, "x" indicates that a considerable amount of scars appear on the tapes and tape-guides, "o" indicates that the scars are negligible, "Δ" indicates that the amount of scars is fair.

As can be seen from Table 1, the synthetic resins, excluding ultra-high-molecular-weight polyethylene and a composition of ultra-high-molecular-weight polyethylene and aluminum silicate, have undesirable frictional characteristics in relation to the magnetic tapes, and cause a considerable amount of scars on the tapes. When tape-guides are made of these materials, the tape-guides per se are exfoliated by friction with the tapes, and exfoliated powder is produced. Consequently, white powder adheres to the magnetic tapes, and image noise is caused in the reproducing mode. If the amount of white powder increases, resistance occurs to the running of the tapes, and finally the running of the tape would be stopped.

The applicant found that ultra-high-molecular-weight polyethylene had a good frictional characteristic and, when this material was used, the amount of scars on the guides and tape was relatively small. These result are considered to be based on the nature that the molecular weight of ultra-high-molecular-weight polyethylene is very large, i.e. 800,000 or more, and ultra-high-molecular-weight polyethylene has a low frictional characteristic.

The tape-guide made only of ultra-high-molecular-weight polyethylene has a low surface hardness, and the surface of the guide may have unevenness. In order to solve this drawback, it is preferable that 5 to 40% by weight of an inorganic additive (aluminum silicate, calcium carbonate, etc.) be added to ultra-high-molecular-weight polyethylene. The inorganic additive may be oxides (silica, alumina, etc.), hydroxides (aluminum hydroxide, etc.), carbonates (calcium carbonate, etc.), silicates (talc, mica, glass beads, etc.), and carbon-base material (carbon black, etc.). Table 1 shows the result of tests relating to ultra-high-molecular-weight polyethylene mixed with about 17% by weight of aluminum silicate. The tape-guide made of this material has a low frictional characteristic and a high surface hardness, and scars are negligible.

It has been found that a still lower frictional characteristic can be attained by adding 0.2 to 2% by weight of a lubricant (e.g. silicone high-polymeric resin).

In addition to the aforementioned ultra-high-molecular-weight polyethylene, olefin-base polymers such as polyprophylene and polystyrene may be used similarly. It is desirable that these polymers be ultra-high-molecular-weight polymers, e.g. having the molecular weight of about 800,000 or more.

FIGS. 3 and 4 show the tape-guide 10 according to this embodiment of the present invention.

The tape-guide 10 was manufactured by injection molding, using a material consisting mainly of ultra-high-molecular-weight polyethylene. In this embodiment, the length of the tape-guide 10 is about 16 mm, and the outer diameter thereof is about 6 mm. The material of the tape-guide 10 has stereoregularity and crystallizability. The material contains 60 to 89% by weight of ultra-high-molecular-weight polyethylene as a matrix, which has a molecular weight of 800,000 or more, and 12 to 18% by weight of aluminum silicate as an additive. In addition, it is desirable that the material include 7 to 13% by weight of ultra-high-molecular-weight polyethylene as a quality improving agent, which has a molecular weight of 150 million to 350 million, 0.17 to 0.31% by weight of silicone high-molecular resin as a lubricant, and a suitable amount of carbon black as a coloring agent.

When the tape-guide 10 is manufactured, the above materials are mixed uniformly in advance, and pellets of the mixture, each having the length of 1 to 2 mm and the outer diameter of 1 to 2 mm, are prepared. Thereafter, the pellets are melted and injected into an injection molder. Thus, tape-guides each having a predetermined size are formed. By this method, 7 to 13% by weight of ultra-high-molecular-weight polyethylene having a molecular weight of 150 million to 350 million can be uniformly mixed with other substances, and the tape-guides 10 having a uniform quality can be manufactured.

It is desirable that a mold for forming the tape-guide 10 have a shape such that three recesses 11 are formed at an upper end portion of a product. The recess 11 has a depth of, e.g. 0.5 mm for receiving a gate residue or a burr 13 formed by a hole, from which the material is injected, and remaining on the product or the tape-guide, when the project is separated from the material filled in a gate in the mold. The burr 13 is situated within the recess 11 such that an end portion of the burr 13 does not project from the recess 11. Thus, the injection-molded product is obtained as tape-guide 10 in its finished form, and a finishing process for the project, after the injection molding, can be omitted. Unlike the manufacture of a conventional metallic tape-guide, the method of this invention does not need many steps. The tape-guide 10 of this invention can be manufactured only by the injection molding step. The number of recesses 11 and the interval of arranged recesses 11 can be suitably changed in accordance with the size of the tape-guide 10 and the kind of the material.

Figure 5:
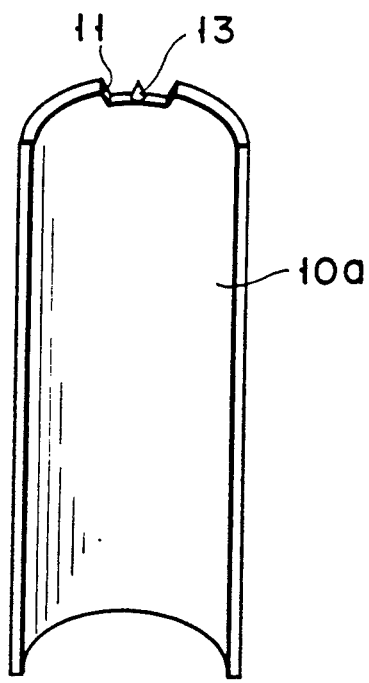
FIG. 5 is a perspective view of a semi-cylindrical tape-guide according to another embodiment of the invention.

FIG. 5 shows a semicylindrical tape-guide 10 according to another embodiment of the invention.

Like the above-described cylindrical tape-guide 10, the semicylindrical tape-guide 10 was manufactured by injection-molding a material consisting mainly of ultra-high-molecular-weight polyethylene. A end portion of the tape-guide 10 is provided with a recess 11 in which the burr 13 is situated. The semicylindrical tape-guide 10a can be made of half the material for the cylindrical tape-guide 10, and the manufacturing cost can be reduced.

Figure 6:
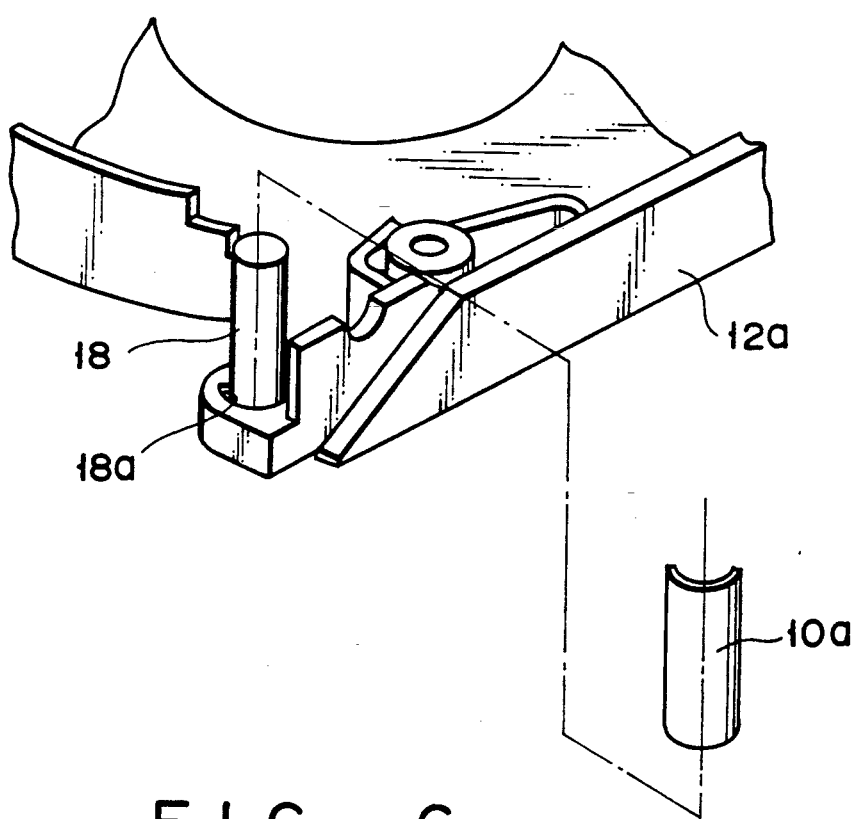
FIG. 6 is a perspective view showing part of a cassette in which the tape-guide of FIG. 5 is to be disposed.

FIG. 6 shows part of the cassette body in which a semicylindrical tape-guide 10a is mounted. In order to fix the tape-guide at a desired location, a semicircular groove 18a is formed in the vicinity of a pin 18 in either or both of under cover 12a and upper cover 12b. The groove 18a is located such that the tape-guide 10a contacts the magnetic tape over a range of α (FIG. 2). The tape-guide 10a is fitted in the groove 18a and the lower and upper covers 12a and 12b are coupled. Thus, the tape-guide 10a is firmly clamped between the covers 12a and 12b, thereby guiding the magnetic tape.

As has been described above, when the semicylindrical tape-guide 10a is employed, the pin 18 may or may not be provided on the casing body 12. The upper cover 12b may be provided with a groove corresponding to the groove 18a. If the pin 18 is omitted, the structure of the casing body 12 is simplified, and the material of the casing body is saved.

Figure 7:
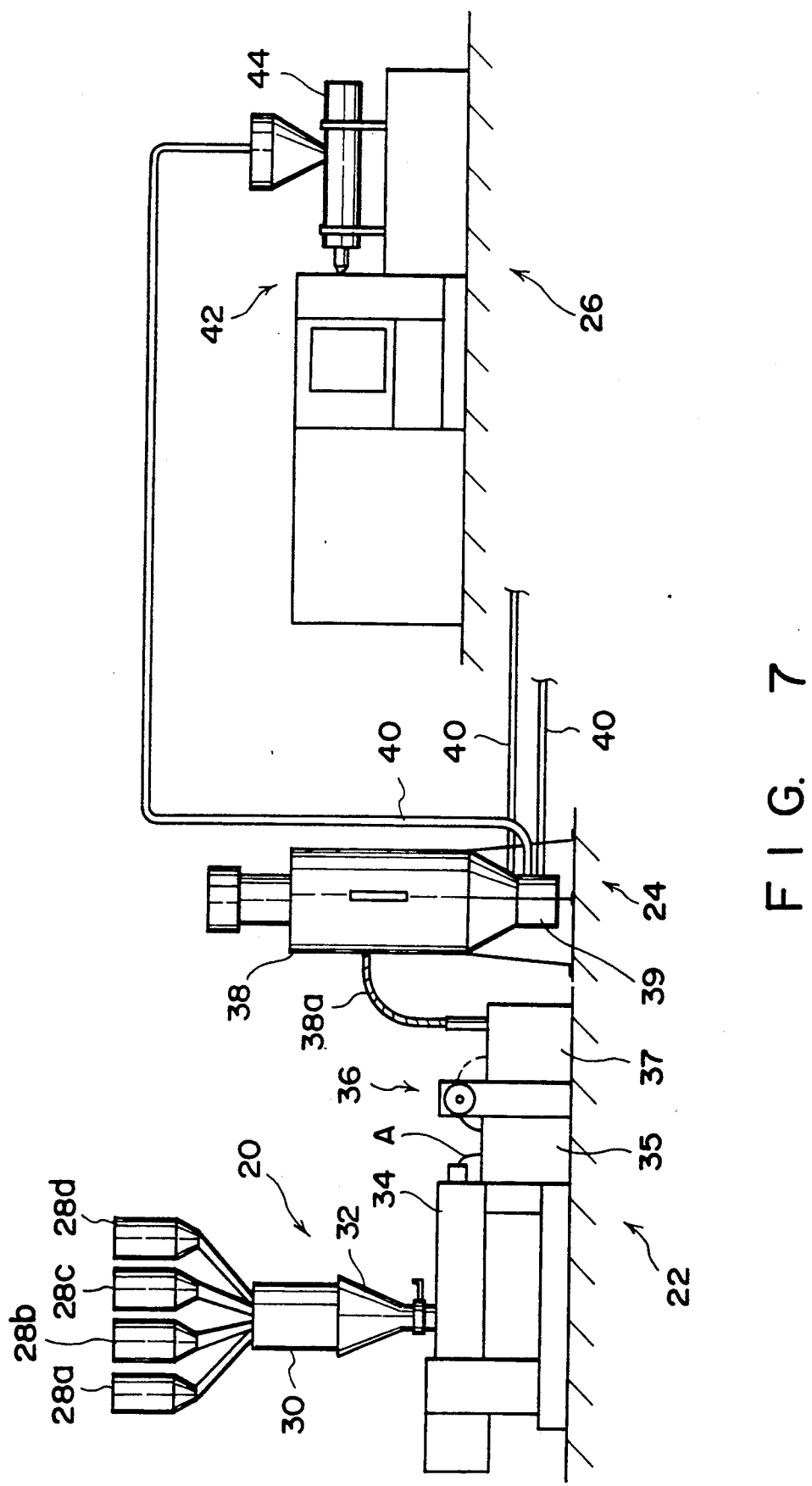
FIG. 7 schematically shows the entire structure of an apparatus for manufacturing the tape-guide.

FIGS. 7 to 9 show an apparatus for manufacturing the tape-guide 10 (10a) by the above-described method.

This apparatus comprises a mixing station 20 for mixing pellets of a plurality of materials, a pelletizing station 22 for pelletizing once again the mixed material, a drying station 24, and an injection-molding station 26.

The mixing station 20 comprises measuring hoppers 28a to 28d for measuring the pellet-shaped various materials, respectively, a mixer 30 for mixing uniformly the measured materials, and a feed hopper 32 for feeding the mixed material to the pelletizing station 22. The aforementioned matrix, additive, quality improving agent, lubricant, coloring agent are put in the measuring hoppers 28a to 28d and are measured by the hoppers 28a to 28d. These materials are uniformly mixed by the mixer 30 and the mixed material is fed to the pelletizing station 22 through the feed hopper 32.

The pelletizing station 22 comprises a cylinder 34 for melting the mixed material and a rolling cutter 36. The cylinder 34 melts the mixed material fed from the feed hopper 32, and delivers a molten wire-like material A having a diameter of 1 to 2 mm. The molten material A is dipped in cooling water in a tank 35 located between the cylinder 34 and the cutter 36. Thus, the molten material A is hardened. The hardened material is cut by the cutter 36 into pellets, each having the length of about 1 to 2 mm. The pellets of the mixed material are stored in an output-side tank 37.

The drying station 24 comprises a cylindrical drying unit 38. The drying unit 38 sucks the pellets of the mixed material through a suction pipe 38a, and dries the pellets with hot air. The dried pellets are held in a holder 39. The pellets are fed the holder 39 to one or more injection-molding stations 26 through an air-convey pipe 40. The drying unit 38 dries a predetermined batch of pellets at a time at about 110° C. for about four hours. The injection-molding station 26 includes an injection-molding unit 42.

The pellets of the mixed material fed from the air-convey pipe 40 are heated up to about 240° to 270° C. within a cylinder 44 in the injection-molding unit 42

The heated material is then fed to a mold unit 46 (shown in FIG. 8) in units of a predetermined quantity.

As is shown in FIG. 8, the mold unit 46 comprises first to third rectangular plate assemblies 48, 50 and 52. The first plate assembly 48 is secured to the cylinder 44. The endface (left surface in FIG. 8) of the first plate assembly 48, which faces the second plate assembly 50, has an opening through which pressurized molten material is injected from the cylinder 44. The second plate assembly 50 and the third plate assembly 52 can be moved, relative to the first plate assembly 48, by means of a reciprocally actuating member 54 coupled to the third plate assembly 52. A plurality of guide rods 43 are fixed to the first plate assembly 48. The second and third plate assemblies 50 and 52 are guided by the guide rods 43. In addition, the first plate assembly 48 and the second plate assembly 50 are coupled by a plurality of links 45, and similarly the second plate assembly 50 and the third plate assembly 52 are coupled by a plurality of links 45.

As is shown in FIGS. 8 and 9, the second plate assembly 50 comprises a thick plate 51a and a thin plate 51b which are fixed to each other, as one body, by means of bolts (not shown) or the like. The thick plate 51a contains a plurality of cylindrical molds 62 having stepped portions, and a cover member 60 for closing a cavity 68 in the mold 62. For example, three projections 64 are disposed on the surface of the cover member 60, which faces the mold 62. Each projection 64 has a pinpoint gate 64a from which the molten mixed material is injected into the cavity 68. The cover member 60 is put in contact with the end face of the mold 62 within the thick plate 51a, and the cover member 60 is held by the thin plate 51b. When the bolts (not shown) are loosened, the relative position of the molds 62 and cover member 60 in the circumferential direction can be changed. A passage 61 for the molten material is formed in the thin plate 51a. The passage 61 communicates the molds 62.

As has been stated above, by changing the position of the cover member 60 relative to the mold 62, the roundness of the cylindrical tape-guide can remarkably be enhanced. For example, in the case of the tape-guide having an outer diameter of 6 mm, the tolerance of roundness is within 25 $\mu$m. In general, the roundness of the molded product is greatly influenced by the flow of material. In particular, when a plurality of products are obtained at a time by injection molding, as in the above-described process, the arrangement of the gates is very important. By virtue of the use of the rotatable cover member 60, the roundness of products can be enhanced.

Core pins 58 are disposed on the surface of the third plate assembly 52, which faces the second plate assembly 50. The core pins 58 are aligned in the axial direction with the cavities of the molds 62 in the second plate structure 62. The surfaces of the core pins 58 are roughened so that the core pins 58 can draw out the tape-guides from the mold cavities 68.

In the mold unit 46, the third plate assembly 52 is pushed by the member 54 and is moved towards the first plate assembly 48 along the guide rods 43. When the end portions of the core pins 58 of the third plate assembly 52 abut upon the surface of the cover member 60, the core pins 58 are put into the cavities 68 of the molds 62, as is indicated by dot and dash lines in FIG. 9. A cylindrical space 69 is formed between the outer peripheral surface of the core pin 58 and the inner peripheral surface of the mold 62. The projections 64 are placed within the space 69. When the third plate assembly 52 is further pushed, the second plate assembly 50 starts to move. Finally, the mutually facing surfaces of the second plate assembly 50 and the first plate assembly 48 are abutted on each other.

In this state, a predetermined amount of the molten mixed material is injected from the cylinder 44 into the passage 61 in the second plate assembly 50 through the opening in the first plate assembly 48. Then, the molten material is injected in to the space 69 in each mold 62 through the pinpoint gates 64a in each cover member 60. Thus, the tape-guide 10, as shown in FIG. 3, is formed. The recesses 11 of the tape-guide 10 are formed by the projections 64. The burr 13 is a remaining portion cut from the pinpoint gate 64a. As has been stated above, the burr 13 does not extend beyond the recess 11. On the other hand, when the semicylindrical tape-guide 10a, as shown in FIG. 5, is manufactured, the shape of the core pin 58 is changed. In this case, the number of pinpoint gates 64a in each cover member 60 may be only one or two.

The tape-guide, thus produced, is taken out in the following manner.

The member 54 is moved in the reverse direction (to the left in FIG. 8). The third plate assembly 53 is separated from the second plate assembly 50. The core pins 58 are pulled out of the cavities 68 of the molds 62. In this procedure, the product or the tape-guide formed in the space 69 is cut from the gate 64a, is pulled out along with the core pin 58, and is fallen from the space between the second plate assembly 50 and the third plate assembly 52.

When the piston 54 is further moved, the second plate assembly 50 coupled to the third plate assembly 52 by means of the links 45 is also separated from the first plate assembly 48. The material remaining in the passage and gate in the second plate assembly 50 falls between the first and second plate assembly 48 and 50. The fallen material is pelletized and melted again, and is used as material of tape-guides.

According to the above-described apparatus, the tape-guide having a very precise roundness can be manufactured, and the finishing step for the product can be omitted, with no waste of material.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A tape guide for a magnetic tape, comprising:
a body having a semi-cylindrical outer surface shape to guide the magnetic tape and an axial end portion, and said end portion having at least one recess;
said body being formed from a mixture material injected into a mold;
said mixture material containing 60 to 89% by weight of an ultra-high-molecular-weight polyolefin base resin having a molecular weight of 800,000, 4 to 25% by weight of an inorganic additive, and 0.17 to 0.31% by weight of a lubricant which is preferably silicone high-polymeric resin;
said ultra-high-molecular-weight polyolefin base resin containing 7 to 13% by weight ultra-high-molecular-weight polyethylene resin having a molecular weight of 150 million to 350 million; and said inorganic additive being one selected from the group consisting of oxides, hydroxides, carbonates, silicates, and carbon-base material.

2. The tape guide according to claim 1, wherein said oxides consist of silica and alumina, said hydroxides consist of aluminum hydroxide, said carbonates consist of calcium carbonate, said silicates consist of talc, mica, glass and aluminum silicate, and said carbon-base material is carbon.

3. The tape guide according to claim 1, wherein said mixture material contains a coloring agent.

4. The tape guide according to claim 1, wherein said recess is open at an end face of said end portion.

5. The tape guide according to claim 1, wherein said body has a semi-cylindrical inner surface and said recess is open at the inner surface of said body.

* * * * *